United States Patent
Davis

(10) Patent No.: US 10,697,244 B2
(45) Date of Patent: Jun. 30, 2020

(54) METHOD OF DRILLING VERTICAL AND HORIZONTAL PATHWAYS TO MINE FOR SOLID NATURAL RESOURCES

(71) Applicant: Jimmy Lynn Davis, Texarkana, TX (US)

(72) Inventor: Jimmy Lynn Davis, Texarkana, TX (US)

(*) Notice: Subject to any disclaimer, the term of this patent is extended or adjusted under 35 U.S.C. 154(b) by 0 days.

(21) Appl. No.: 16/396,504

(22) Filed: Apr. 26, 2019

(65) Prior Publication Data
US 2019/0249493 A1    Aug. 15, 2019

Related U.S. Application Data

(63) Continuation-in-part of application No. PCT/IB2017/056705, filed on Oct. 28, 2017.
(Continued)

(51) Int. Cl.
*E21B 7/28* (2006.01)
*E21B 43/14* (2006.01)
(Continued)

(52) U.S. Cl.
CPC ............ *E21B 7/046* (2013.01); *E21B 7/04* (2013.01); *E21B 7/06* (2013.01); *E21B 7/28* (2013.01);
(Continued)

(58) Field of Classification Search
CPC ... E21B 7/04; E21B 7/046; E21B 7/06; E21B 7/28; E21B 21/06; E21B 41/0035; E21B 41/0042; E21B 43/006; E21B 43/14; E21B 43/30; E21B 43/305; E21B 43/29; E21B 43/292; B09B 1/008; E21F 15/00;
(Continued)

(56) References Cited

U.S. PATENT DOCUMENTS 2,061,317 A * 11/1936 Brack .................. E21B 7/06
175/80
2,500,267 A * 3/1950 Zublin ................ E21B 7/068
175/75
(Continued)

FOREIGN PATENT DOCUMENTS

| RU | 2236537 C2 | 9/2004 |
| RU | 2382166 C1 | 2/2010 |

*Primary Examiner* — David J Bagnell
*Assistant Examiner* — Michael A Goodwin

(57) ABSTRACT

A method of drilling vertical and horizontal pathways to mine for solid natural resources involves a drill bit, at least one reamer, a first plugging material, and a second plugging material; drilling a testing wellbore to a specific vertical depth with the drill bit and identifying at least one desired mining section wherein the desired mining section is associated with a corresponding vertical depth; creating a new bottom end for the testing wellbore by filling the testing wellbore up to an offset distance with the first plugging material; drilling a horizontal access hole from the new bottom end into the desired mining section with the drill bit and enlarging it with a reamer; excavating cuttings from the desired mining section through the horizontal access hole; filling the horizontal access hole with the second plugging material; and repeating the drilling, enlarging, and filling process to create a plurality of lateral holes.

9 Claims, 14 Drawing Sheets

Related U.S. Application Data

(60) Provisional application No. 62/413,285, filed on Oct. 26, 2016.

(51) Int. Cl.

| | | |
|---|---|---|
| *E21B 43/40* | (2006.01) | |
| *E21B 7/06* | (2006.01) | |
| *E21B 43/29* | (2006.01) | |
| *E21B 21/06* | (2006.01) | |
| *E21B 7/04* | (2006.01) | |
| *E21B 43/30* | (2006.01) | |
| *E21B 41/00* | (2006.01) | |
| *E21B 47/00* | (2012.01) | |
| *E21B 49/06* | (2006.01) | |
| *E21B 3/00* | (2006.01) | |
| *E21C 41/00* | (2006.01) | |
| *G01V 3/08* | (2006.01) | |
| *E21B 33/13* | (2006.01) | |

(52) U.S. Cl.
CPC ............ *E21B 21/06* (2013.01); *E21B 21/065* (2013.01); *E21B 41/0042* (2013.01); *E21B 43/14* (2013.01); *E21B 43/29* (2013.01); *E21B 43/30* (2013.01); *E21B 43/305* (2013.01); *E21B 43/40* (2013.01); *E21B 47/00* (2013.01); *E21B 49/06* (2013.01); *E21C 1/00* (2013.01); *E21C 41/14* (2013.01); *G01V 3/081* (2013.01); *E21B 33/13* (2013.01)

(58) Field of Classification Search
CPC ......... E21F 15/005; E21F 15/06; E21F 15/08; E21F 15/10
See application file for complete search history.

(56) References Cited

U.S. PATENT DOCUMENTS

| | | | |
|---|---|---|---|
| 3,961,824 A * | 6/1976 | Van Eek | E21B 10/32 |
| | | | 299/17 |
| 4,289,354 A | 9/1981 | Higgins, Jr. | |
| 4,676,313 A * | 6/1987 | Rinaldi | E21B 43/12 |
| | | | 166/250.15 |
| 6,454,000 B1 * | 9/2002 | Zupanick | E21B 43/006 |
| | | | 166/105 |
| 2004/0007390 A1 * | 1/2004 | Zupanick | E21B 7/061 |
| | | | 175/61 |
| 2005/0038603 A1 * | 2/2005 | Thomas | E21B 43/14 |
| | | | 702/6 |
| 2006/0131024 A1 * | 6/2006 | Zupanick | E21B 7/046 |
| | | | 166/313 |
| 2009/0020335 A1 * | 1/2009 | Cooper | E21B 7/061 |
| | | | 175/61 |
| 2015/0168597 A1 * | 6/2015 | Bai | G01V 99/00 |
| | | | 703/10 |
| 2016/0123096 A1 * | 5/2016 | Mathieson | E21C 41/16 |
| | | | 299/7 |
| 2017/0241266 A1 * | 8/2017 | Cherry | E21B 43/34 |

\* cited by examiner

METHOD OF DRILLING VERTICAL AND HORIZONTAL PATHWAYS TO MINE FOR SOLID NATURAL RESOURCES

The current application is a continuation-in-part (CIP) application of the Patent Cooperation Treaty (PCT) application PCT/IB2017/056705 filed on Oct. 28, 2017. The PCT application PCT/IB2017/056705 claims a priority to the U.S. Provisional Patent application Ser. No. 62/413,285 filed on Oct. 26, 2016.

FIELD OF THE INVENTION

The present invention generally relates to a method of drilling vertical and horizontal pathways to mine for solid natural resources. In particular, the present invention is a method of drilling horizontal access holes to excavate solid natural resources embedded into planar formations disposed at different vertical depths.

BACKGROUND OF THE INVENTION

Currently in the coal mining industry, two key methods are used to mine and recover coal reserves:
1) Strip mining are used to recover surface lignite/bituminous coal reserves which is effective only to depths of + or −300' deep; and
2) Shaft mines are used to access deeper reserves and usually recover bituminous coals at depths up to + or −1500' deep.

Both of the methods are dangerous and under heavy Environmental Protection Agency (EPA) scrutiny for environmental impacts. Strip mines cause a host of environmental issues. Strip mines produce lignite coal which is also called a "dirty coal", although some strip mines do produce clean coal. The process is very damaging to the environment and requires massive reclamation work to replace the surface area damages.

People in the coal mining industry utilize draglines and shaft mines to recover coal. These people are not privy to actual abilities of oil and gas recovery drilling rigs and associated machinery or practices.

People in the oil and gas recovery industry only see small amounts of coal while drilling and deem it to be a waste product, that comes out of the wellbore in the cuttings. Even during the drilling of coal seams for coal bed methane, the coal is considered a waste product as the main objective is methane gas recovery. The excavated coal is never weighed, measured, or sold. It is destroyed as waste material.

The method of the present invention as presented provides many benefits over current coal mining methods:
  Coal can be drilled in places that a dragline or shaft mine may not be accessible due to terrain/or climate.
  Setting up a dragline takes years of prep and destroys thousands of acres of surface area, necessitating millions of dollars of environment repair. A drilling rig can mine up to 2600 acres from one 2-acre site that can be repaired by covering with grass seed and cause minimal damage to environment.
  Lignite mines cost many millions of dollars and take years to set up, while a drilling rig can bring coal to surface within a week or so after rigging up, again without damaging the environment and drilling provides "clean coal"
  The biggest benefit is due to the vast cost to strip mine and reclamation. Drilling coal is faster, cleaner and cheaper than strip mining. An estimate is that the coal produced from the present invention will provide 30% per ton cheaper than buying and shipping from Wyoming to Texas. An average savings of hundreds of thousands of dollars per day, essentially cutting energy fuel cost by 30% on production of electricity.

In addition to these benefits, the method of the present invention circumvents the limitations of conventional mining and oil and gas recovery methods. Using modified oil and gas drilling tools, the method of the present invention allows mining for solid natural resources embedded in very deep formations underground. Whereas, conventional mining methods are limited to depths of 1500' to 2100', the method disclosed is capable of mining depths between 500' to 12000'. Additionally, the solid natural resources are extracted through narrow holes dug exceptionally deep into the earth's crust. This limits the damage done to the environment and obviates the massive reclamation works needed to replace the displaced surface area.

Even though the method of the present invention utilizes relatively narrow wellbores, compared to the oil and gas industry, the wellbores are actually quite large. Whereas in the oil and gas industry, the wellbore is deliberately kept as narrow as possible, the present invention utilizes a reaming process to enlarge the wellbore and to extract the maximum amount of solid natural resources. Further, the number of wellbore in the oil and gas industry are deliberately kept to a minimum. Usually, oil and gas extraction processes attempt to utilize just a single wellbore. In contrast, the present invention utilizes a plurality of lateral holes that are radially distributed around the wellbore. Additionally, the plurality of lateral holes may be constructed at several vertical depths. This allows for extraction of the maximum amount of solid natural resources out of the formations.

Finally, the method of the present invention also permits an efficient waste disposal mechanism. More specifically, the plurality of lateral holes need to be plugged after the all of the solid natural resources are excavated. Thus, various types of waste materials, such as coal ash, carbon dioxide or solids from exhaust, municipal waste, medical waste, salt water, oil-base mud solids, and/or fracturing water, may be mixed into the plugging material. As a result, the method of the present invention allows of disposal of waste materials deep into the earth's crust which minimizes environmental impact.

DETAILED DESCRIPTION OF THE INVENTION

All illustrations of the drawings are for the purpose of describing selected versions of the present invention and are not intended to limit the scope of the present invention.

Figure 1:
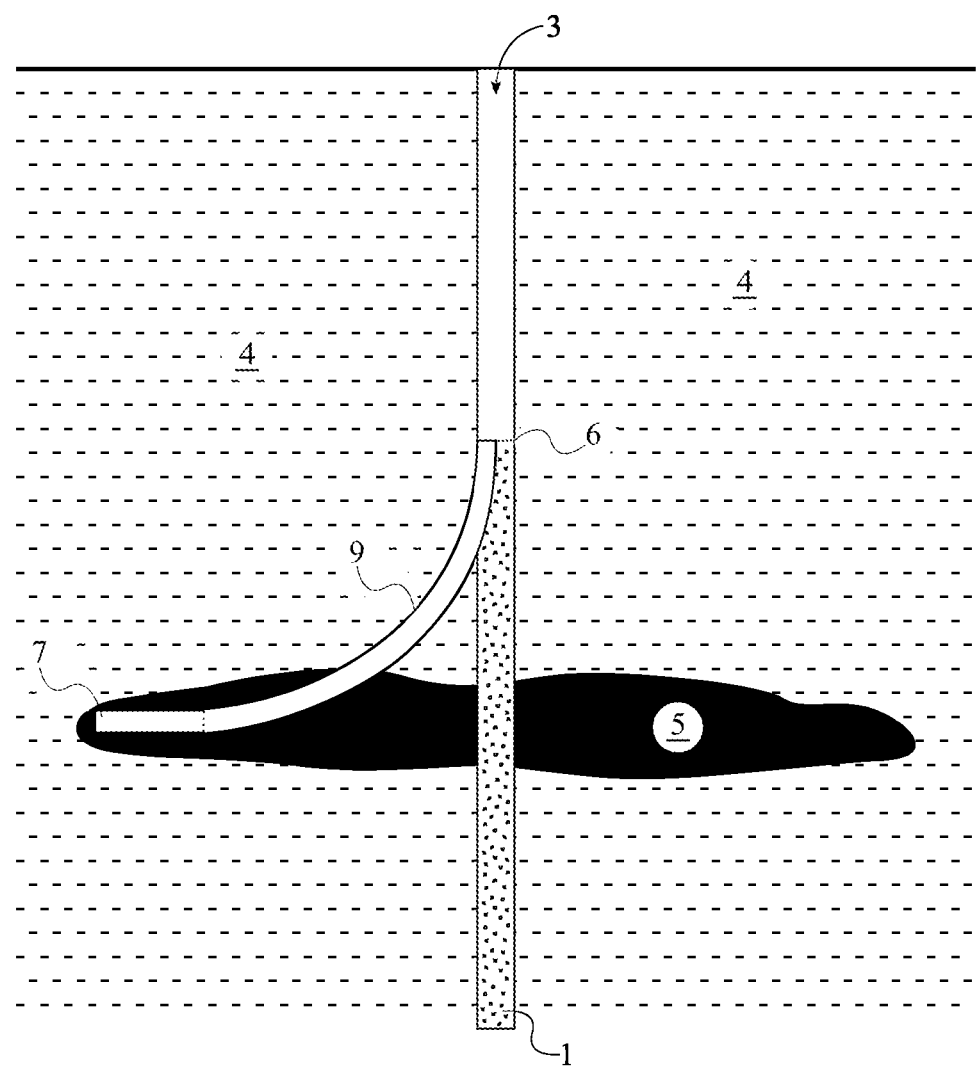
FIG. 1 is a side schematic view of the testing wellbore showing a single horizontal access hole.
Figure 4:
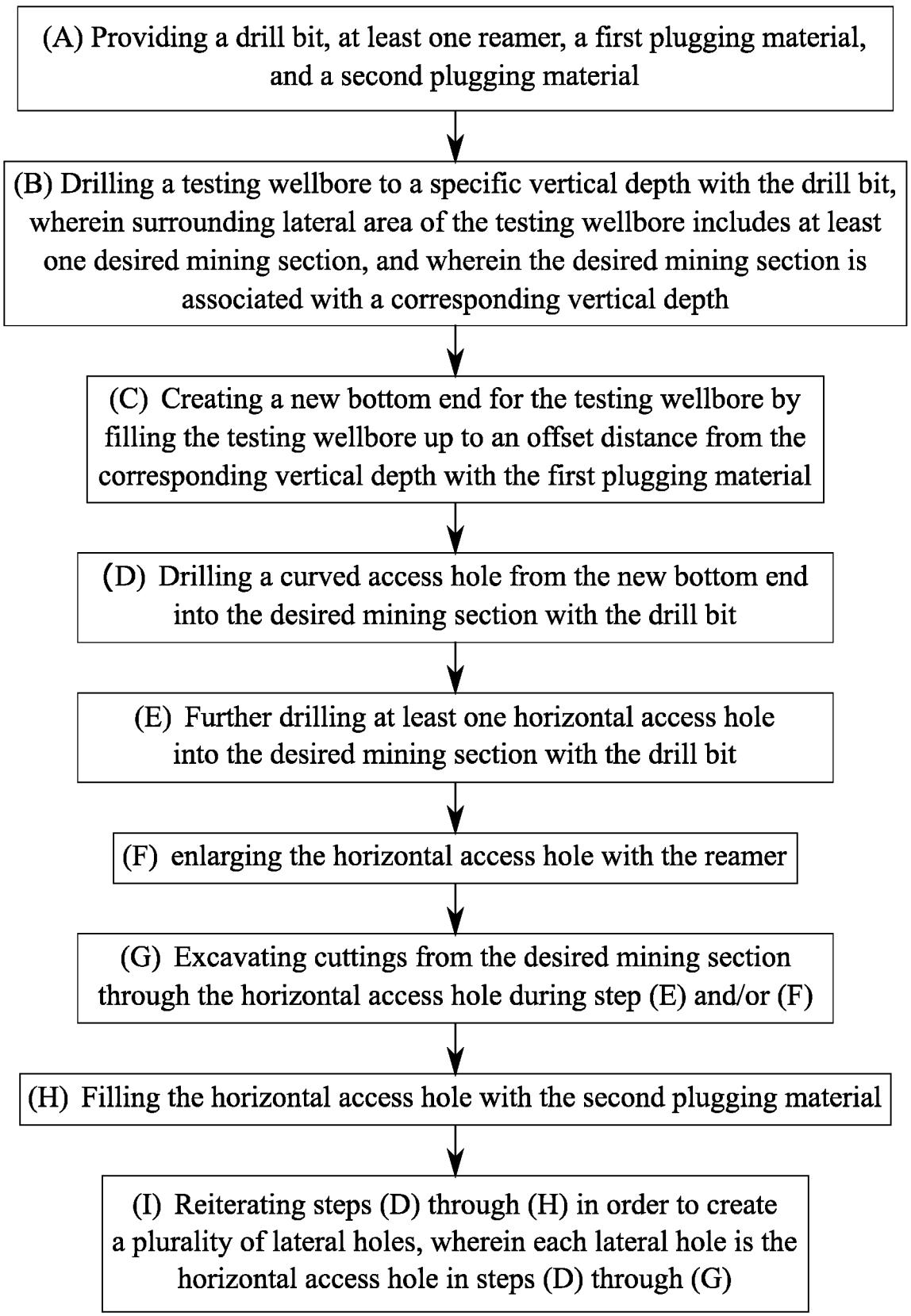
FIG. 4 is a flow chart showing the order of operation of Step A through Step I.

In reference to FIG. 1 and FIG. 4, the present invention is a method of drilling vertical and horizontal pathways to mine for solid natural resources. Horizontal pathways are used to extract solid natural resources embedded into underground formations. As such, this method maximizes the amount of solid natural resources that can be excavated out of naturally occurring underground formations. The method of the present invention utilizes modified drilling equipment used in the oil and gas drilling industry. In particular, the system used to implement the method of the present invention comprises a drill bit, at least one reamer, a first plugging material 1, and a second plugging material 2 (Step A). The drill bit uses cutting elements mounted onto rotating conical elements that roll across the face of the borehole. This allows the drill bit to create a cylindrical hole in the earth's crust for the discovery and extraction of solid natural resources such as coal, minerals, and/or precious metals. Similarly, the reamer enlarges the borehole and extracts embedded resources from the formations. The first plugging material and the second plugging material are used to backfill a borehole once the resources have been extracted.

An overall process for the present invention begins by drilling a testing wellbore 3 to a specific vertical depth with the drill bit (Step B). The method of the present invention enables mining at exceptionally high vertical depths. The specific vertical depth may be anywhere from 500' to 12000', with the possibility of drilling up to 15000' currently being researched. For context, the deepest mine in America today is 2100'. This method also enables mining at an exceptionally shallow vertical depth of 500'. The surrounding lateral area 4 of the testing wellbore includes at least one desired mining section 5 wherein the desired mining section 5 is associated with a corresponding vertical depth. The desired mining section 5 is the area of the formation that contains the desired solid natural resources. Thus, once the testing wellbore is constructed, the testing wellbore provides a conduit for transporting the solid natural resources out of the desired mining section 5 to the surface. The testing wellbore is constructed by drilling a plurality of holes. After the plurality of holes are drilled, a casing is placed into each of the holes. A casing is a large diameter pipe constructed out of a plurality of individual sections that are screwed together. The length of the casing can be adjusted by increasing or decreasing the number of individual sections. Once the casing is inserted into the corresponding hole, cement or similar filling material is pumped into the casing. An opening located at the bottom of the casing allows the cement to fill the gap between the casing and the corresponding hole. This reinforces the hole and prevents the collapse of the sidewalls of formation.

The preferred embodiment of the testing wellbore comprises a conductor hole, a surface hole, and a pilot hole. The conductor hole drilled into the surface of the formation. A conductor casing placed into the conductor hole prevents the loose soil near the surface from caving in and blocking the wellbore. Once the conductor casing is set, a 17½" surface hole is drilled beneath the conductor casing. The preferable surface hole has a depth of 500'-2300' which positions the surface hole below the water board depth. Alternately, the surface hole may have a much shallower depth of 500'. This requires drilling through natural aquifers embedded into the formations which increases the chances of contaminating the water supply. As such, the surface casing is placed into the surface hole to protect natural underground aquifers from contamination. More specifically, the surface casing forms a seal between the testing wellbore and the surrounding formations. The preferred pilot hole is a 12¼" hole that starts below the surface hole and continues to a depth of up to 12,000'. Alternately, the present invention allows for the creation of a pilot hole with a depth of anywhere from 500' to 12000'. This is especially useful for extracting solid natural resources embedded into very deep or very shallow formations.

After the pilot hole is created, the testing wellbore is inspected for solid natural resources such as coal and precious metals. This is achieved by inspecting the material composition of the formations at a plurality of vertical depths. The vertical depths of the most promising formations are the desired mining sections 5. This process results in at least one desired mining section 5 and the corresponding vertical. The method of the present invention then entails creation a new bottom end for the testing wellbore by filling the testing wellbore up to an offset distance from the corresponding vertical depth with the first plugging material (Step C). More specifically, the pilot hole is plugged up 500'-1000' above the desired mining section 5 with the first plugging material. In this case, the first plugging material may be cement. Once the cement is cured the new bottom elevation is now the Kick Off Point (KOP). The drill bit that fits into the pilot casing is lowered into the pilot casing, and the horizontal drilling process begins. Moreover, the drill bit is fitted onto a steering tool that allows the drill bit to change direction while drilling through the formation. As such, the drill bit can drill a curved access hole 9 from the new bottom end into the desired mining section 5 with the drill bit (Step D). This positions the drill bit horizontal in relation to the testing wellbore and in an ideal position to penetrate the planar formations. Planar formations, as herein referred to, are layers of solid natural resources embedded into the natural soil formations found in the earth's crust. The at least one desired mining section 5 are planar formations composed of mainly of the solid natural resources. Thus, to extract the solid natural resources, at least one horizontal access hole 7 is drilled into the desired mining section 5 (Step E). The horizontal access hole penetrates several thousand feet into the planar formations to extract the maximum amount of solid natural resources. Since the planar formations usually incline no more than 1°-2° the horizontal access hole can access the planar formation while remaining horizontal. The at least one horizontal access hole can be a plurality of horizontal access holes that branch out of the curved access hole.

Figure 2:
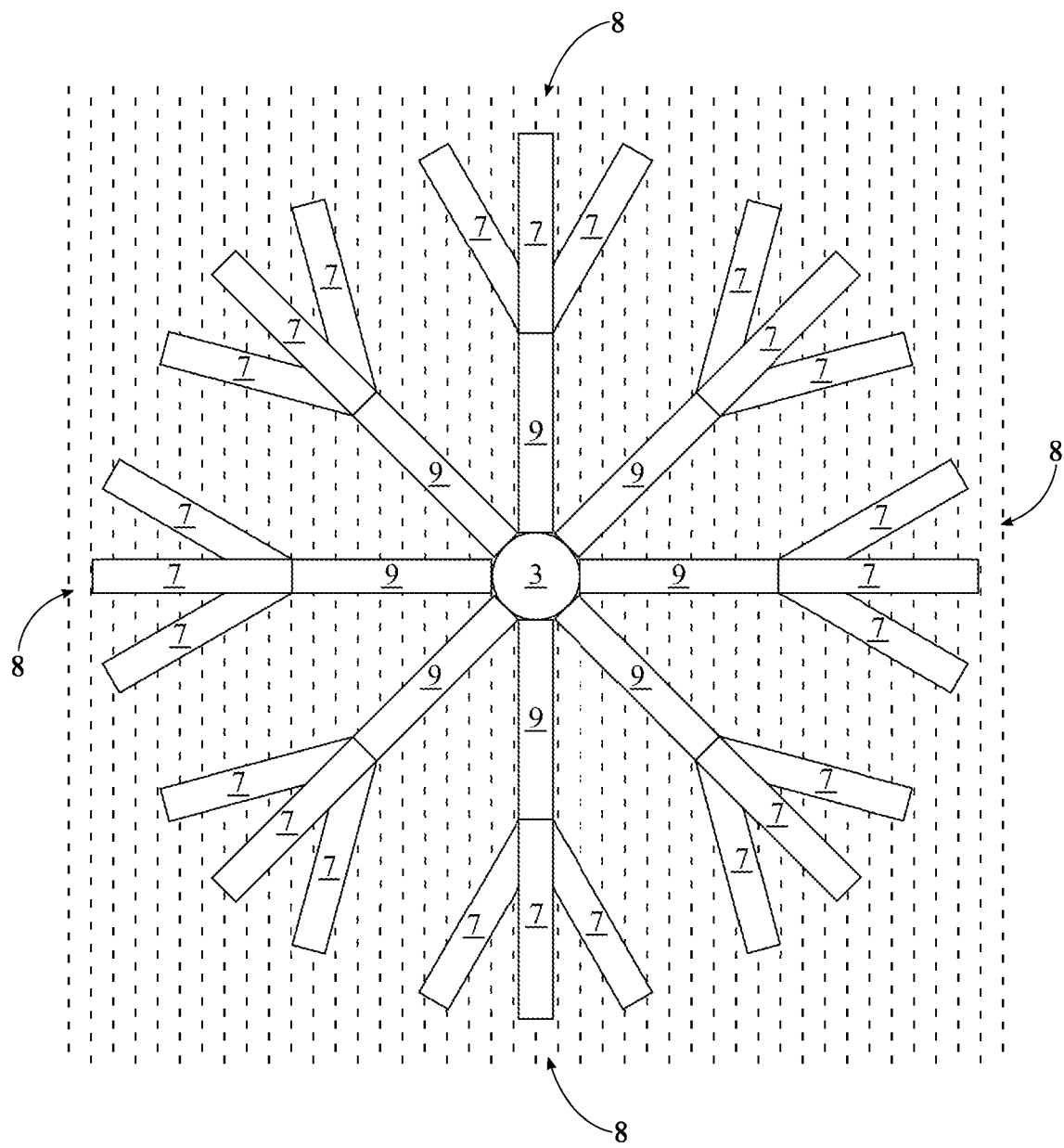
FIG. 2 is a top schematic view of the testing wellbore showing the plurality of lateral holes.
Figure 6:
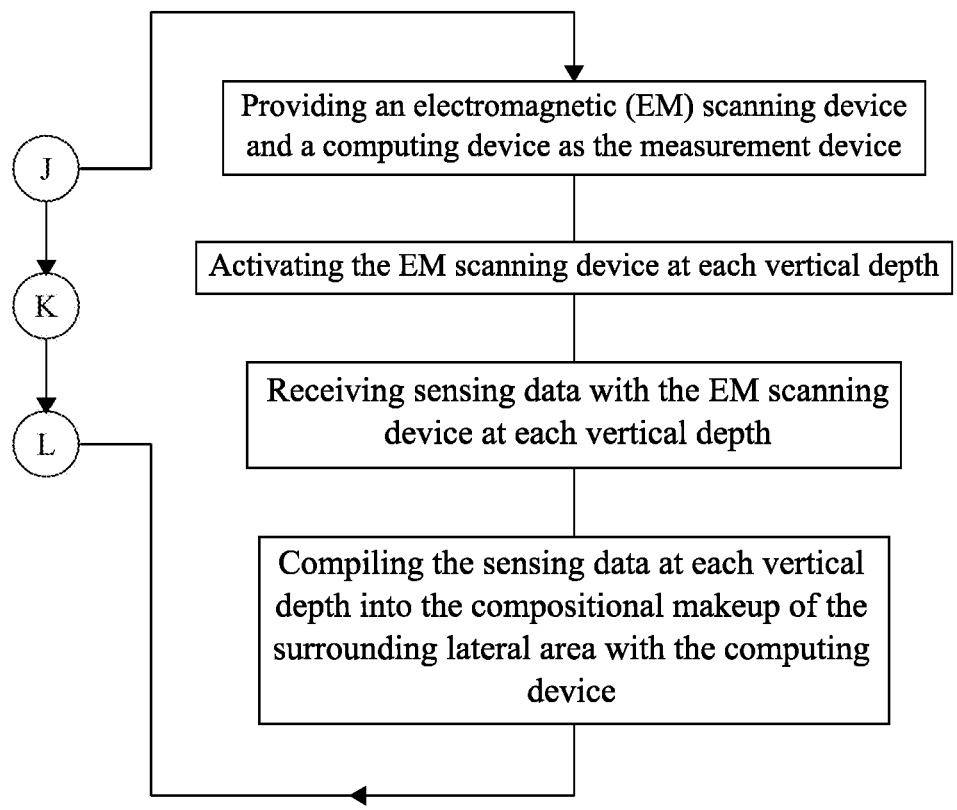
FIG. 6 is a flow chart showing the sub-processes of Step J through Step K, wherein an EM scanning device is utilized.

Further, the process of extracting the solid natural resources from the horizontal access hole also involves enlarging the horizontal access hole with the reamer (Step F). The preferred reamer is retractably mounted behind the drill bit, extending only during the enlarging process. In the extended position, the reamer has a larger diameter than the drill bit thereby allowing the horizontal access hole to be enlarged. Accordingly, once extended, the reamer starts rotating and is slowly pulled out of the horizontal access hole. As the reamer slowly recedes out of the horizontal access hole, the reamer grinds the surrounding formation into a slurry. The slurry contains cuttings of the solid natural resources that are to be excavated. This serves as the principal mechanism for excavating cuttings from the desired mining section 5 through the horizontal access hole during Step E and/or Step F (Step G). As the slurry gets pumped to the surface, it carries the cuttings out of the testing wellbore and to the surface for retrieval. Once all of the solid natural resources are excavated out of the horizontal access hole, the horizontal access hole is plugged close with the second plugging material (Step H). The second plugging material fills the horizontal access hole until it reaches the new bottom end. Once the horizontal access hole is plugged, Step D through Step H are reiterated to create a plurality of lateral holes 8, wherein each lateral hole is the curved access hole and the horizontal access hole in Step D through Step H (Step I). The plurality of lateral holes penetrates the planar formations at multiple points to excavate the maximum amount of solid natural resources. As such, the plurality of lateral holes branches out of the curved access hole. As can be seen in FIG. 2 and FIG. 6, this is achieved by radially positioning the lateral holes around the testing wellbore during Step I.

Figure 10:
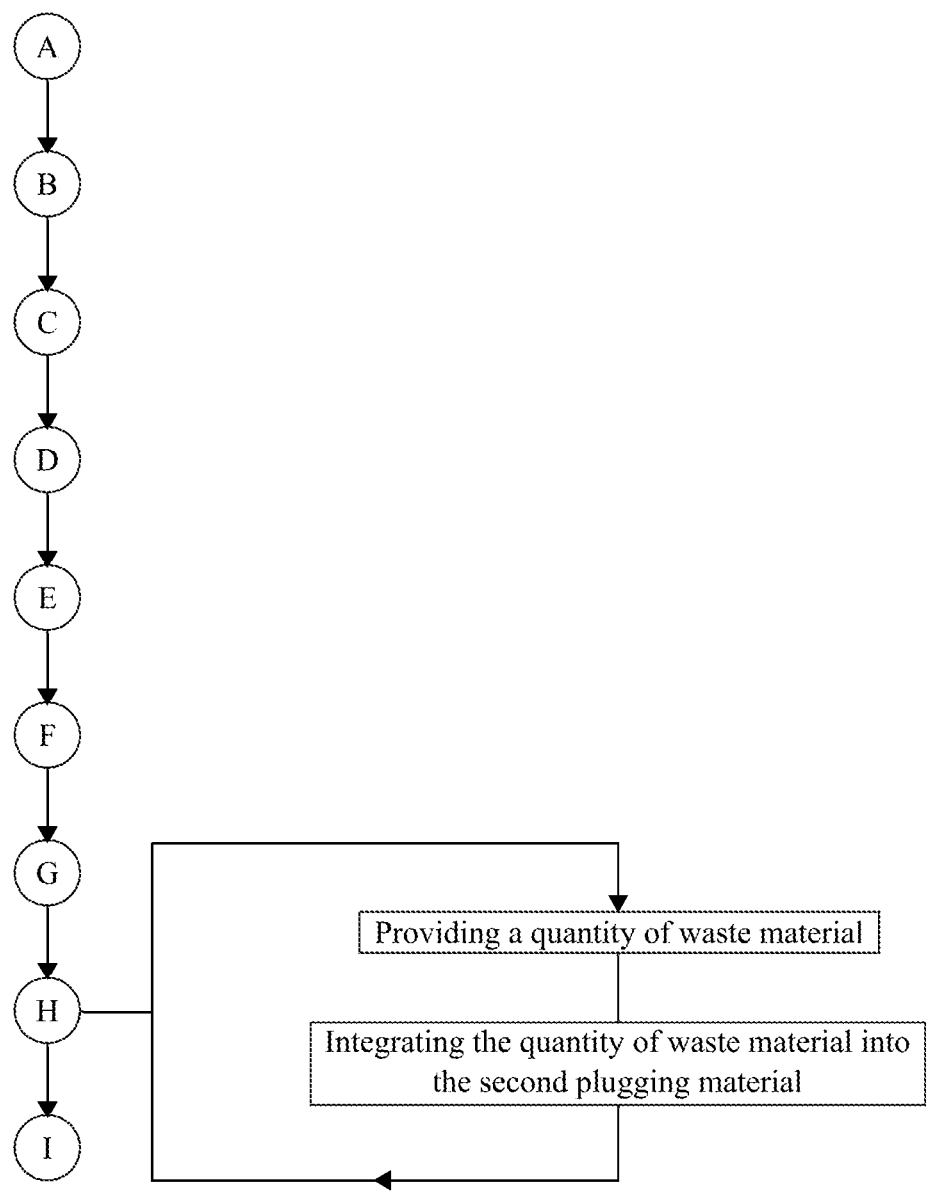
FIG. 10 is a flow chart showing the sub-processes of Step H, wherein the second plugging material is a quantity of waste material.

Referring to FIG. 10, an embodiment of the present invention provides a method of sustainably disposing of unwanted waste material into the ground into the freshly drilled underground lateral holes. This involves providing a quantity of waste material, and integrating the quantity of water material into the second plugging material. In particular, the quantity of waste materials can be, but is not limited to, coal ash, carbon dioxide or solids from exhaust, municipal waste, medical waste, salt water, oil-base mud solids, fracturing water, coal refuse, or other materials.

Figure 5:
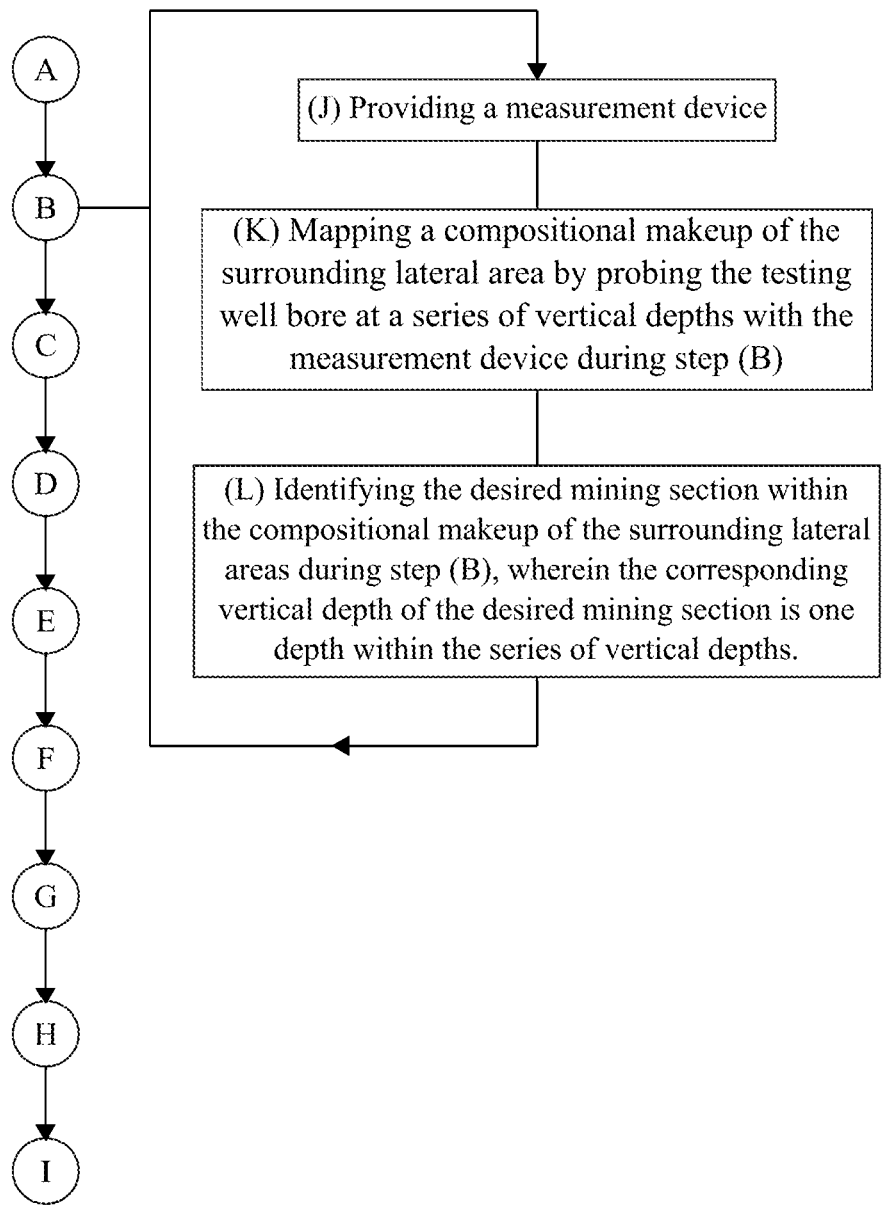
FIG. 5 is a flow chart showing the sub-processes of Step B.

Referring to FIG. 5, the process of determining the desired mining section 5, as explained in Step B, requires providing a measurement device. The measurement device is used in mapping a compositional makeup of the surrounding lateral area by probing the testing wellbore at a series of vertical depths with the measurement device during Step B. More specifically, the measurement device is lowered into the pilot hole of the testing wellbore. As the measurement device travels along length of the pilot hole, the compositional makeup of the surrounding lateral area is inspected at different vertical depths. This is followed by identifying the desired mining section 5 within the compositional makeup of the surrounding lateral areas during Step B, wherein the corresponding vertical depth of the desired mining section 5 is one depth within the series of vertical depths. More specifically, only some of the series of vertical depths may contain promising amounts of solid natural resources. Thus, the desired mining location are the vertical depths that have the most amounts of solid natural resources. In particular, the desired mining section 5 can be composed of an all solid natural resource selected from, but not limited to, bituminous coal, sub-bituminous coal, anthracite, gold, platinum, silver, uranium, lithium, gemstones or diamonds, and/or rare-earth minerals.

Referring to FIG. 6, in one embodiment of the mapping process, the measurement device is an electromagnetic (EM) scanning device and a computing device. The EM scanning device measures the magnetic resistivity of the formations at different vertical depths to determine their exact material compositions. As such, mapping the formations requires activating the EM scanning device at each vertical depth and receiving the sensing data with the EM scanning device at each vertical depth. This allows for the creation of highly detailed mapping data by compiling the sensing data at each vertical depth into the compositional makeup of the surrounding lateral area with the computing device. Thus, the desired mining sections 5 can be selected by reviewing the data from the compositional makeup.

Figure 7:
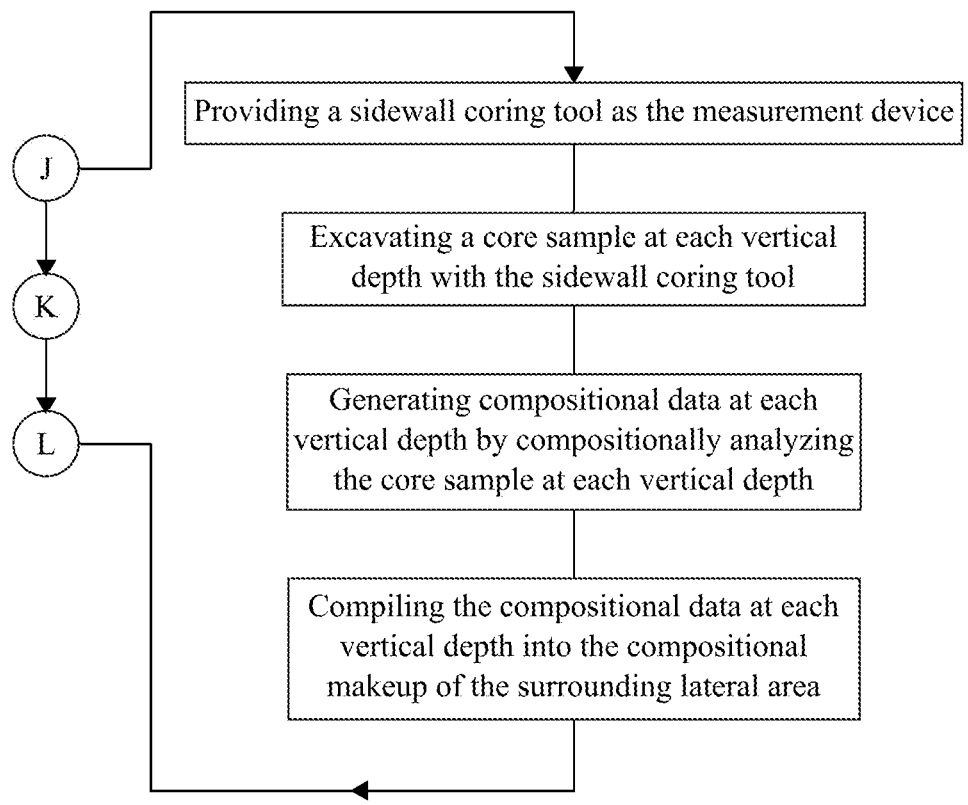
FIG. 7 is a flow chart showing the sub-processes of Step J through Step K, wherein a sidewall coring tool is utilized.
Figure 8:
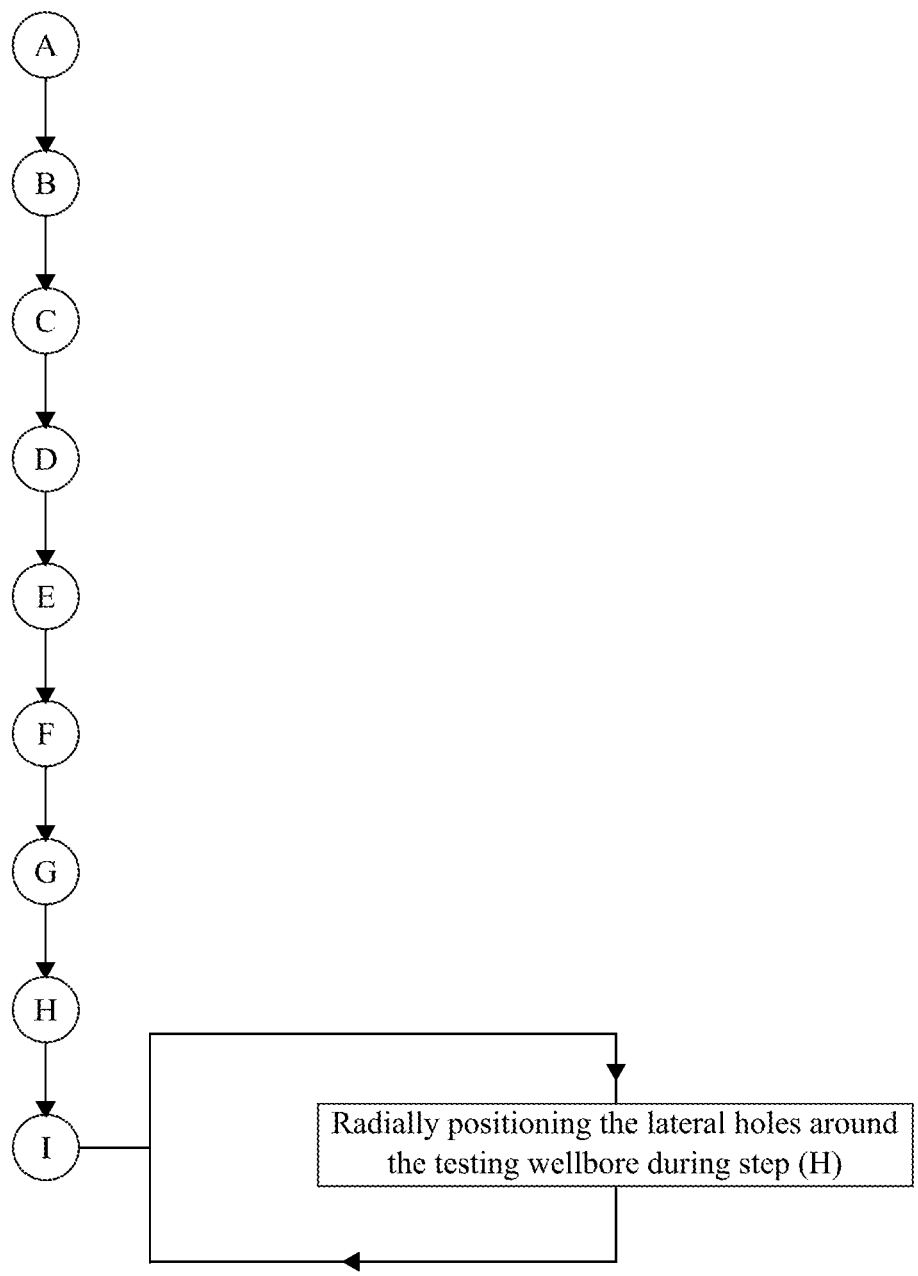
FIG. 8 is a flow chart showing the sub-processes of Step I, wherein a plurality of lateral holes is constructed.

Referring to FIG. 7, in another embodiment of the mapping process, the measurement device is a sidewall coring tool. Alternately, a sidewall logging tool may also be utilized. This requires excavating a core sample at each vertical depth with the sidewall coring tool. The core sample from each vertical depth is retrieved from the testing wellbore and analyzed on the surface for its compositional data. Detailed mapping data is created by compiling the compositional data at each vertical depth into the compositional makeup of the surrounding lateral area. Similar to the other embodiment of the mapping process, the desired mining sections 5 is determined using this mapping data.

Figure 3:
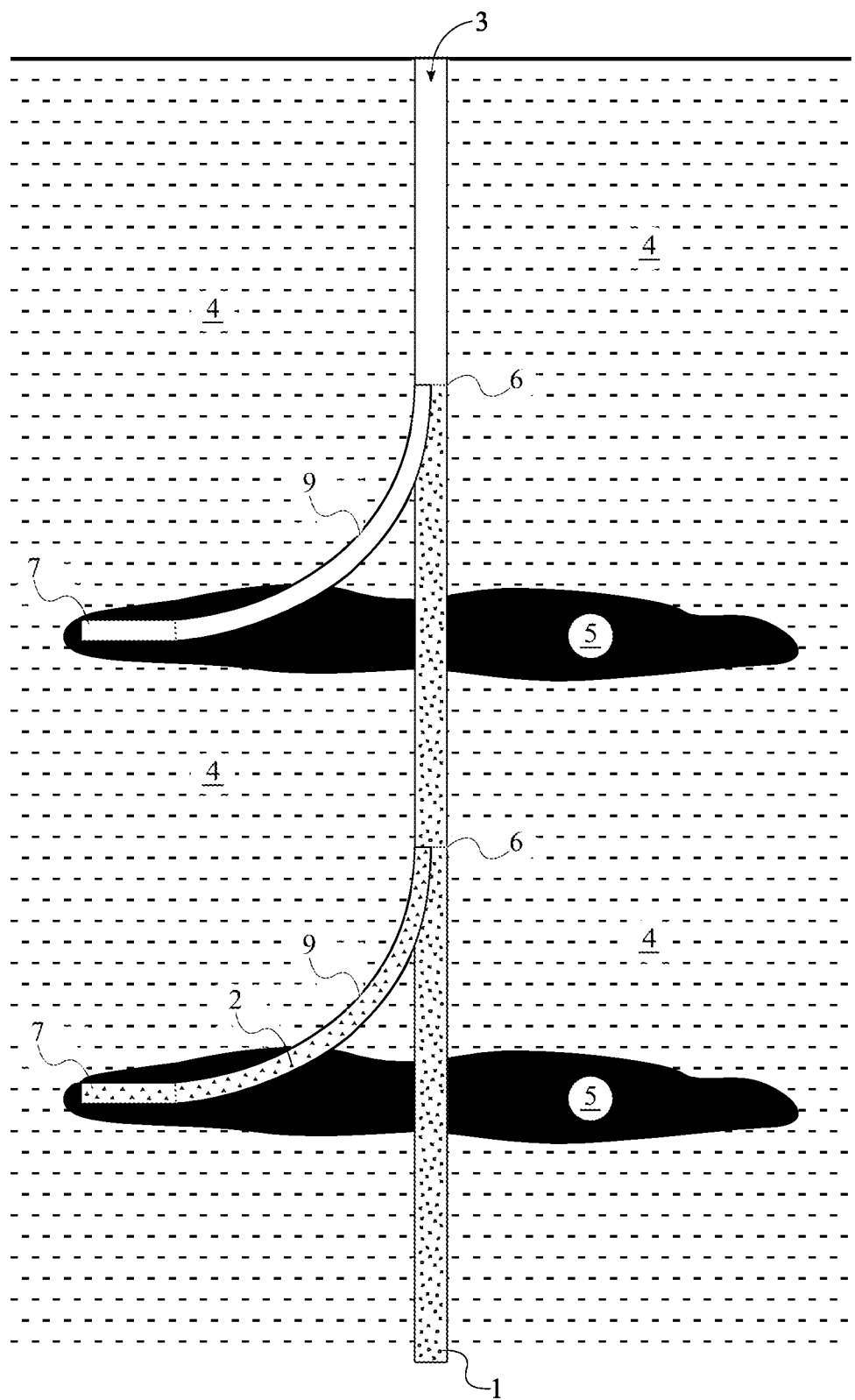
FIG. 3 is a side schematic view of the testing wellbore showing the process for drilling a series of desired mining sections.
Figure 9:
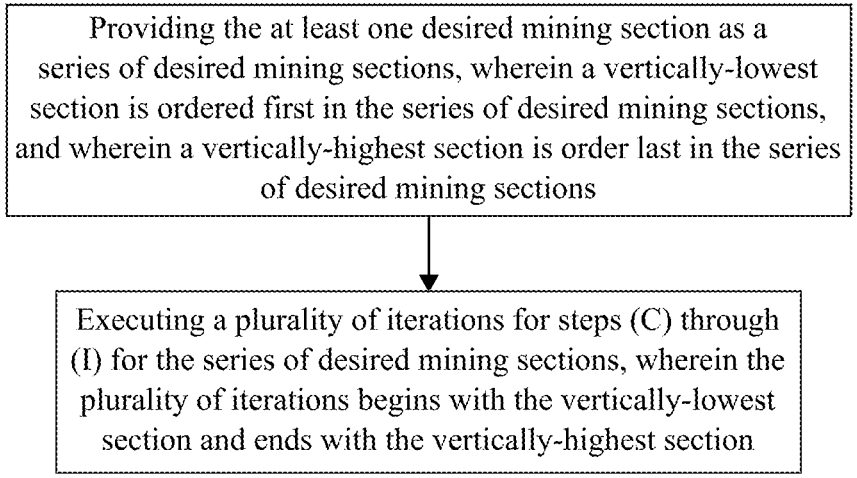
FIG. 9 is a flow chart showing the process of mining a series of desired mining sections.

Referring to FIG. 3 and FIG. 9, the mapping process locates several promising formations at different vertical depths. In many cases, there may be more than one desired mining sections 5. Thus, an embodiment of the present invention may involve a series of desired mining sections 5, wherein a vertically-lowest section is ordered first in the series of desired mining sections 5, and wherein a vertically-highest section is order last in the series of desired mining sections 5. Since the horizontal access hole must be plugged after being excavated, the vertically-lowest section from the series of desired mining sections 5 must be drilled first. As such, the process of excavating a series of desired mining section 5 requires executing a plurality of iterations for Step C through Step I for the series of desired mining sections 5, wherein the plurality of iterations begins with the vertically-lowest section and ends with the vertically-highest section. Each iteration is performed on one of the series of desired mining sections 5. For example, the first of the plurality of iterations is performed on the vertically-lowest section form the series of desired mining sections 5. Once the vertically-lowest section is completely excavated, pilot hole is plugged 1000' above the second lowest section, and the second lowest section is excavated. Alternately, if the second lowest section lies above the 1000', the pilot hole may only be partially plugged up to the second lowest section. The vertically-highest section is the last in the series of desired mining sections 5 to be excavated, once all the desired mining sections 5 below this are used. This process continues until all the series of desired mining sections 5 are excavated, and the pilot hole is completely plugged with the second plugging material.

Figure 11:
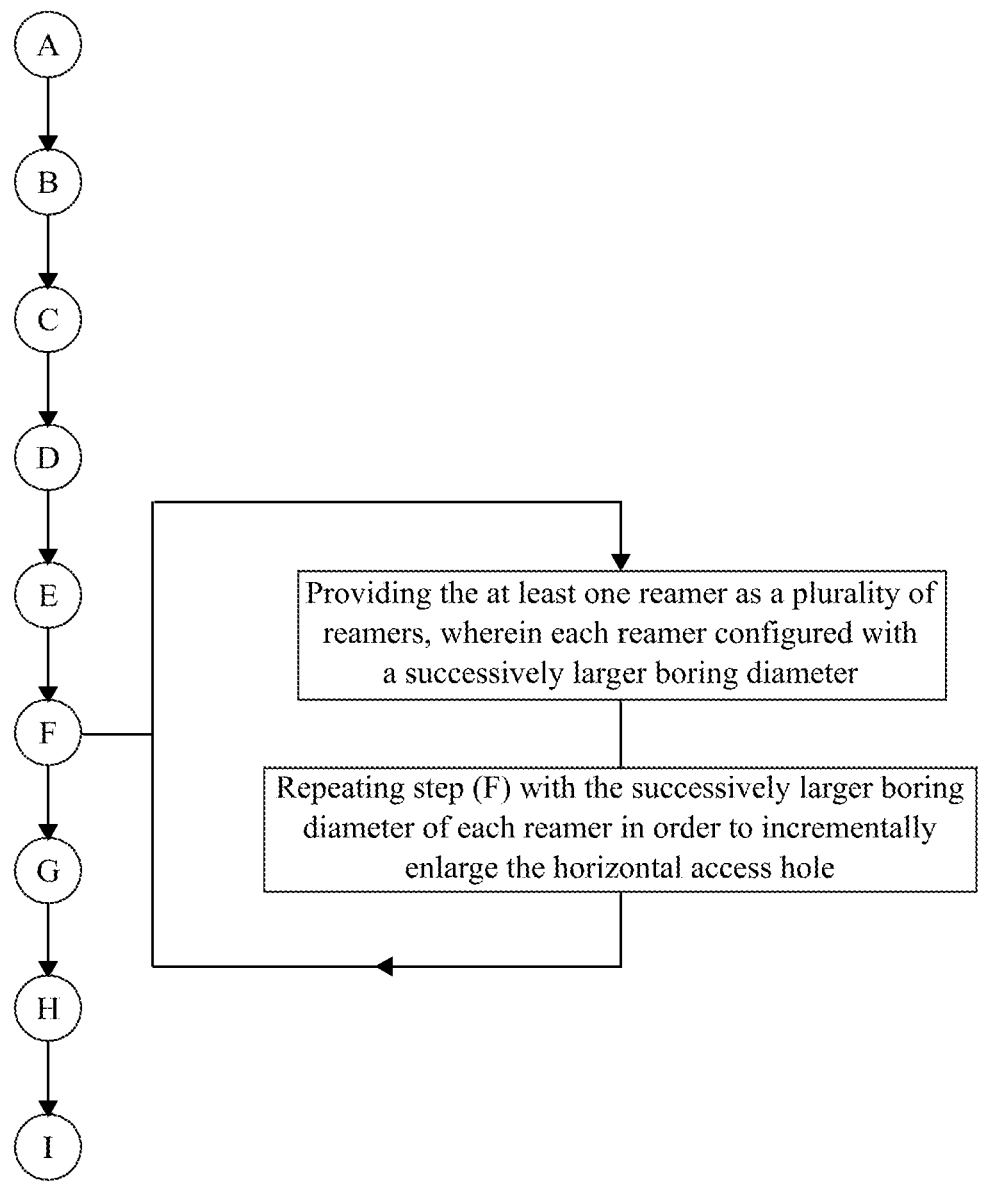
FIG. 11 is a flow chart showing the sub-processes of Step F, wherein a plurality of reamers is utilized.

Referring to FIG. 11, in order to excavate more cuttings from the horizontal access hole, the present invention uses a plurality of reamers, wherein each reamer is configured with a successively larger boring diameter. A larger diameter reamer can grind a greater amount of the planar formations, than a smaller diameter reamer. This increases the number of cuttings being excavated out of the horizontal access hole. Thus, Step F is repeated with the successively larger boring diameter of each reamer in order to incrementally enlarge the horizontal access hole. More specifically, the plurality of reamers travels through the single horizontal access hole, and incrementally enlarges the diameter of the horizontal access hole. As the horizontal access hole is slowly enlarged, the amount of solid natural resources being excavated increases. This process is then repeated for the plurality of lateral holes to maximize the excavation volume out of the planar formations.

Figure 12:
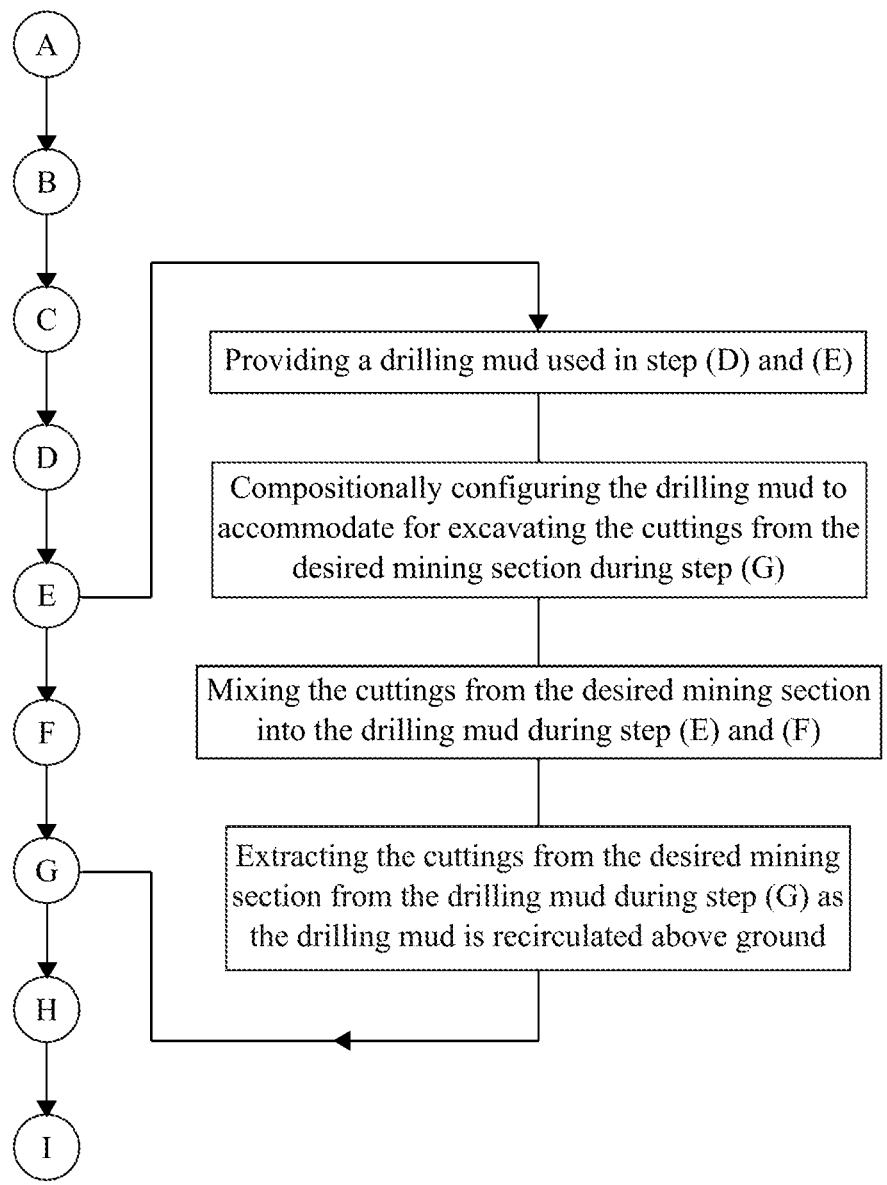
FIG. 12 is a flow chart showing the sub-processes of Step E, wherein the drilling mud is compositionally configured.

Referring to FIG. 12, in one embodiment for the excavation process, the present invention uses a drilling mud for Step D and Step E. One or more pumps located at the surface circulate the drilling mud into and out of the testing wellbore. The drilling mud is compositionally configured to accommodate for excavating the cuttings from the desired mining section 5 during Step G. More specifically, the drilling mud may be compositionally configured to dissolve the surrounding formation while leaving the cuttings completely intact. The drilling mud is pumped to the drill bit and sprayed on the face of the borehole. This softens the borehole and allows the drill bit to drill through the formation. The drilling mud is also pumped to the reamer as the reamer enlarges the horizontal access hole. This allows for mixing the cuttings from the desired mining section 5 into the drilling mud during Step E and Step F and allows for extracting the cuttings from the desired mining section 5 from the drilling mud during Step G as the drilling mud is recirculated above ground. More specifically, as the drilling mud is pumped out of the reamer, the drilling mud transports the cuttings to the surface for retrieval.

Figure 13:
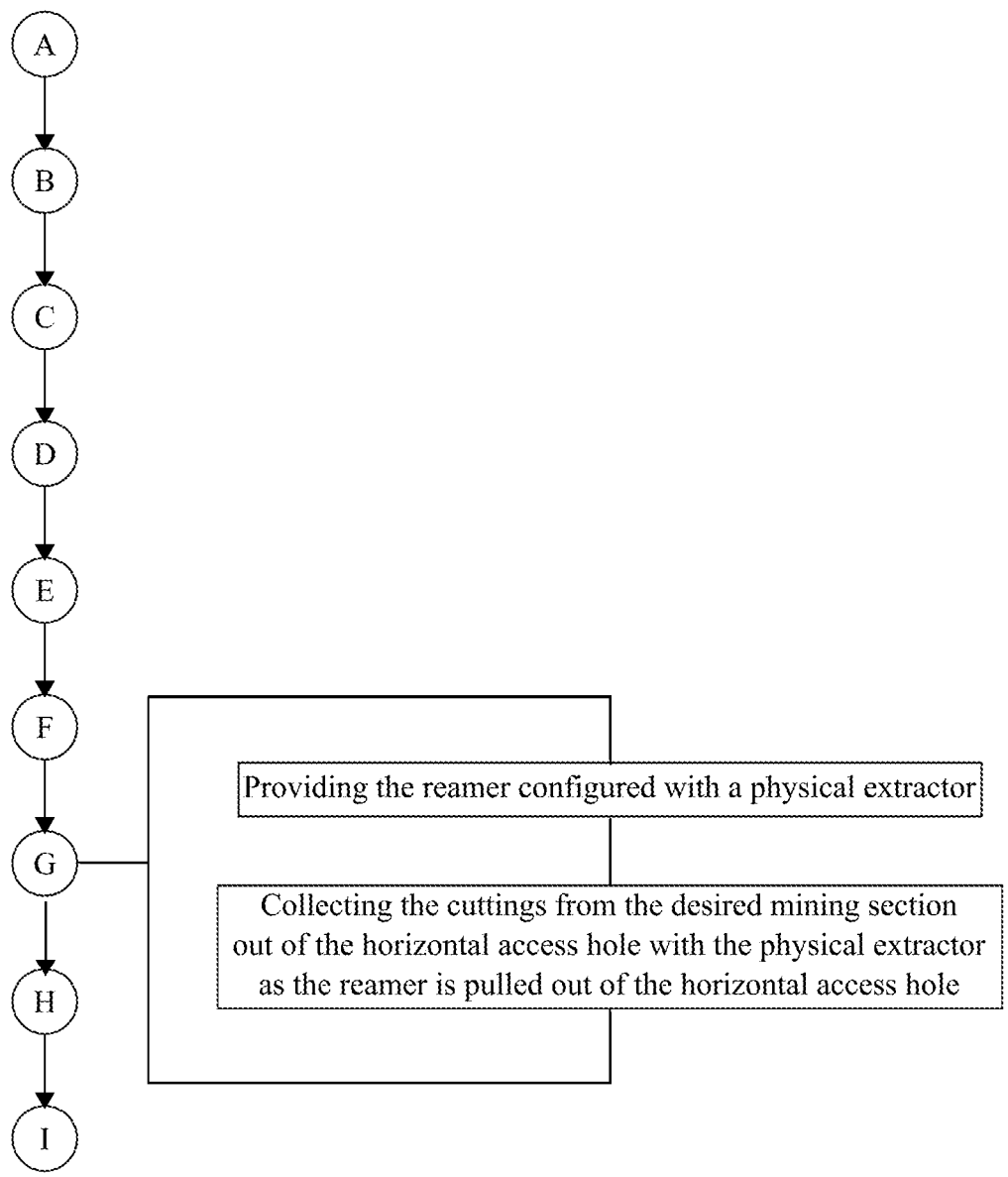
FIG. 13 is a flow chart showing the sub-processes of Step G, wherein the reamer is provided with a physical extractor.
Figure 14:
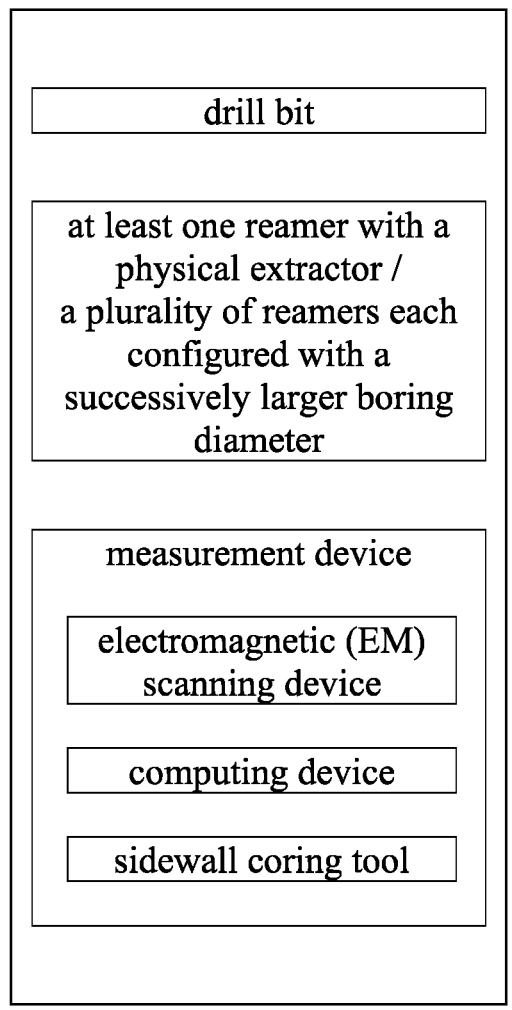
FIG. 14 is a diagram showing apparatus used in the method of the present invention.

Referring to FIG. 13, in another embodiment for the excavation process, the present invention uses a reamer configured with a physical extractor. This obviates the need to suck the cuttings out of the testing wellbore along with the drilling mud. Instead, this involves collecting the cuttings from the desired mining section 5 out of the horizontal access hole with the physical extractor or drilling fluids as the reamer is pulled out of the horizontal access hole.

The present invention has been field tested in a well-site and proven to effectively produce coal in commercial quantities under actual "field conditions". The field test was conducted in Harthstone Formation in Oklahoma which consists of an Upper Hartshorne Coal, shale layer, Upper Hartshorne Sandstone, shale layer, Lower Hartshorne Coal, shale layer, and a Lower Hartshorne Sandstone. The Harthstone formation is part of the larger Arkoma basin which has a minimum areal extent of 8,470 $mi^2$.

The field test was conducted in an existing well site—the Dustin 1H-15 well site. The Dustin 1H-15 well was chosen as a desirable candidate to demonstrate the innovation technologies employed in the present invention. While the known 2.5 to 4.5-foot thickness of the target seam was neither optimal for either staying in-seam in the drilling operation, nor optimal for higher coal production volume; nevertheless, the relatively thin seam afforded an opportunity to demonstrate that method of the present invention could stay in-seam and could routinely produce commercial volumes of coal from seam thicknesses generally deemed too thin and uncommercial for most of today's mining methods.

Further, the Dustin 1H-15 well site has a known sandstone floor that is good for keeping the drill bit in the coal seam; although the shale ceiling could have been problematic. As such, the ability of drill bit to stay totally in the 2.5 to 4.5-foot coal seam while drilling the lateral holes, especially with a ceiling that could easily have caused problems if contacted, strongly indicates of the ability to produce commercial quantities of coal from seams so thin as to normally be ignored.

Drill-mining of the well site proved to be a success with the recovery of commercially-viable quantities of the coal. Drill-mining metric of minutes per ton was monitored intermittently throughout the reaming operations. Initial recovery was around 12 minutes per ton which improved to 2 to 3 minutes per ton by the end of the reaming operations. The total expected recovery, based on displacement, was calculated to be approximately 240 tons, but actual recovery was close to 500 tons.

The field test yielded valuable conclusions and lessons about the viability of the present invention in commercial coal mining operations. More specifically, it proved that the method of the present invention allows "drilling for coal" at depths of up to 12,000 feet, thereby making possible geometric increases in reserves. The enormous economic upside of a significantly enhanced reserve base should substantially outweigh the cost of drilling to deeper depths.

Although the invention has been explained in relation to its preferred embodiment, it is to be understood that many other possible modifications and variations can be made without departing from the spirit and scope of the invention as hereinafter claimed.

What is claimed is:

1. A method of drilling vertical and horizontal pathways to mine for solid natural resources comprising steps of:
   (A) providing a drill bit, at least one reamer, a first plugging material, a second plugging material and a measurement device, wherein the measurement device comprises an electromagnetic (EM) scanning device, a computing device and a sidewall coring tool;
   (B) drilling a testing wellbore to a specific vertical depth with the drill bit, wherein a surrounding lateral area of the testing wellbore includes at least one desired mining section, and wherein the at least one desired mining section is associated with a corresponding vertical depth;
   mapping a compositional makeup of the surrounding lateral area by probing the testing well bore at a series of vertical depths with the measurement device by activating the EM scanning device at each vertical depth, receiving sensing data with the EM scanning device at each vertical depth, excavating a core sample at each vertical depth with the sidewall coring tool, generating compositional data at each vertical depth by compositionally analyzing the core sample at each vertical depth and compiling the sensing data and the compositional data at each vertical depth into the compositional makeup of the surrounding lateral area with the computing device during step (B);
   identifying the at least one desired mining section within the compositional makeup of the surrounding lateral area during step (B), wherein the corresponding vertical depth of the at least one desired mining section is one depth within the series of vertical depths;
   (C) creating a new bottom end for the testing wellbore by filling the testing wellbore up to an offset distance from the corresponding vertical depth with the first plugging material;
   (D) drilling a curved access hole from the new bottom end into the at least one desired mining section with the drill bit;
   (E) further drilling a plurality of horizontal access holes from the curved access hole into the at least one desired mining section with the drill bit;
   (F) enlarging each of the plurality of horizontal access holes with the at least one reamer;
   (G) excavating cuttings from the at least one desired mining section through the plurality of horizontal access holes during step (E) and/or step (F);

(H) filling the plurality of horizontal access holes with the second plugging material; and (I) reiterating step (D) through step (H) in order to create a plurality of lateral holes, wherein each lateral hole is the curved access hole and the plurality of horizontal access holes in step (D) through step (G).

2. The method as claimed in claim 1, wherein the at least one desired mining section is composed of an all solid natural resource selected from the group consisting of: bituminous coal, sub-bituminous coal, anthracite, gold, platinum, silver, uranium, lithium, gemstones or diamonds, and a rare-earth mineral.

3. The method as claimed in claim 1 comprising step of:
radially positioning the plurality of lateral holes around the testing wellbore during step (I).

4. The method as claimed in claim 1 comprising steps of:
providing the at least one desired mining section as a series of desired mining sections, wherein a vertically-lowest section is ordered initially in the series of desired mining sections, and wherein a vertically-highest section is order finally in the series of desired mining sections; and
executing a plurality of iterations for step (C) through step (I) for each of the series of desired mining sections, wherein the plurality of iterations begins with the vertically-lowest section and ends with the vertically-highest section.

5. The method as claimed in claim 1 comprising steps of:
providing a quantity of waste material; and
integrating the quantity of waste material into the second plugging material.

6. The method as claimed in claim 5, wherein the quantity of waste material is selected from a group consisting of: coal ash, carbon dioxide or solids from exhaust, municipal waste, medical waste, salt water, oil-base mud solids, fracturing water and coal refuse.

7. The method as claimed in claim 1 comprising steps of:
providing the at least one reamer as a plurality of reamers, wherein each reamer is configured with a successively larger boring diameter; and
repeating step (F) with the successively larger boring diameter of each reamer in order to incrementally enlarge each of the plurality of horizontal access holes.

8. The method as claimed in claim 1 comprising steps of:
providing a drilling mud used in step (D) and step (E);
compositionally configuring the drilling mud to accommodate for excavating the cuttings from the at least one desired mining section during step (G);
mixing the cuttings from the at least one desired mining section into the drilling mud during step (E) and step (F); and
extracting the cuttings from the at least one desired mining section from the drilling mud during step (G) as the drilling mud is recirculated above ground.

9. The method as claimed in claim 1 comprising step of:
providing the at least one reamer configured with a physical extractor; and
collecting the cuttings from the at least one desired mining section out of the plurality of horizontal access holes with the physical extractor as the at least one reamer is pulled out of the plurality of horizontal access holes.

* * * * *